United States Patent [19]
Faul

[11] Patent Number: 4,662,775
[45] Date of Patent: May 5, 1987

[54] ADAPTOR FOR STEERING WHEEL

[75] Inventor: Thomas L. Faul, Ontario, Canada

[73] Assignee: Teckserve Limited, Rama, Canada

[21] Appl. No.: 780,794

[22] Filed: Sep. 27, 1985

[51] Int. Cl.$^4$ .......................... F16D 1/00; F16D 1/06; B62D 1/06

[52] U.S. Cl. .................................. 403/365; 403/356; 403/361; 403/359; 403/298; 74/492; 74/552

[58] Field of Search .............. 403/365, 366, 361, 359, 403/252–254, 299, 301, 265, 266, 368, 260, 298; 74/492, 552; 464/156, 155, 158, 180, 182

[56] References Cited

U.S. PATENT DOCUMENTS

| | | | |
|---|---|---|---|
| 1,707,353 | 4/1929 | Fraser | 403/359 X |
| 2,111,642 | 3/1938 | Saier | 403/361 X |
| 2,664,002 | 12/1953 | Anderson | 464/180 X |
| 3,173,462 | 3/1965 | Koeppel | 403/361 X |
| 3,641,834 | 2/1972 | Barenyi | 74/492 |
| 3,742,656 | 7/1973 | Amos | 403/359 X |
| 4,473,317 | 9/1984 | Bolang | 403/359 |

FOREIGN PATENT DOCUMENTS

| | | | |
|---|---|---|---|
| 2901024 | 7/1980 | Fed. Rep. of Germany | 74/552 |
| 294034 | 7/1928 | United Kingdom | 74/552 |
| 1091765 | 11/1967 | United Kingdom | 74/552 |
| 2058694 | 4/1981 | United Kingdom | 74/552 |

OTHER PUBLICATIONS

Teckserve Ltd. Distributor Catalogue; one page made public as cited by applicant Oct., 1984.

*Primary Examiner*—Richard J. Scanlan, Jr.
*Assistant Examiner*—Todd G. Williams
*Attorney, Agent, or Firm*—Riches, McKenzie & Herbert

[57] ABSTRACT

A molded, one-piece adaptor for concentrically connecting a steering wheel and a steering wheel shaft is disclosed. In particular, the adaptor is useful when the steering wheel shaft has a tubular form, but the adaptor may be readily modified in order to connect to a steering wheel shaft having a rod-like form. The adaptor comprises an upper portion and a lower portion. The upper portion has a mechanism for meshing with the steering wheel. The lower portion engages with the steering wheel shaft. If the steering wheel shaft is tubular, the steering wheel shaft slips over the lower portion which has a plurality of tapered ribs which are spaced around and extend axially along the lower portion. These tapered ribs tend to take up any variation in tolerances so as to reduce the rocking between the steering wheel and steering wheel shaft.

17 Claims, 9 Drawing Figures

ADAPTOR FOR STEERING WHEEL

BACKGROUND OF THE INVENTION

This invention relates to a molded, one-piece adaptor for concentrically connecting a steering wheel and a steering wheel shaft. The adaptor has particular utility for connecting a steering wheel shaft having a tubular form, but may be readily modified in order to connect a steering wheel shaft having a rod-like form.

In the past, steering wheels were connected to steering wheel shafts by fitting a rod-like steering wheel column into a larger metallic cylinder and then welding the spokes of the steering wheel to the metallic cylinder.

With the advent of one-piece, molded plastic steering wheels, the spokes of the steering wheel could no longer to welded to the metallic cylinder. Accordingly, a spline mechanism was developed in order to mesh the steering wheel with the adaptor. However, all of these types of adaptors were connected to rod-like steering wheel shafts rather than steering wheel shafts having a tubular form. The connection of the adaptor to the steering wheel shaft was typically made by way of a key in a key way or some type of spline mechanism on the adaptor and the end of the steering wheel shaft. Also, in those types of adaptors, in order to ensure that the steering wheel remained fitted to the steering wheel shaft, a bolt had to be screwed into a hole in the end of the rod-like steering wheel shaft or the end of the steering wheel shaft had to be threaded to screw into the steering wheel.

Recently, there has been a desire to use tubular steering wheel shafts rather than rod-like steering wheel shafts. However, when using tubular steering wheel columns, problems have been encountered with undesirable rocking between the steering wheel and steering wheel shaft. It is believed that this rocking was caused because the fit between the adaptor and steering wheel shaft was not tight enough due to the variations in tolerances in the steering wheel shaft and the adaptor.

SUMMARY OF THE INVENTION

Accordingly, it is an objection of this invention to provide an adaptor for concentrically connecting a steering wheel shaft to a tubular steering wheel column that results in a minimum of rocking.

Also, it is an object of this invention is provide an adaptor that can connect a steering wheel to a tubular steering wheel shaft and, with a minimum of modification, connect the steering wheel to a rod-like steering wheel shaft.

Accordingly, in one of its broad aspects, this invention resides in providing a molded, one-piece adaptor for concentrically connecting a steering wheel and a steering-wheel shaft, comprising: a substantially-cylindrical upper-portion having an axis for meshing with the steering wheel, and a substantially-cylindrical lower-portion depending concentrically from the upper-portion for connecting to the steering-wheel shaft; wherein, the upper-portion has: a plurality of meshing means extending axially along and spaced around the periphery thereof; and a threaded hole extending downwardly and concentrically within the upper-portion; and wherein the lower-portion has: a plurality of tapered ribs extending axially along and spaced around the periphery thereof, wherein the outside faces of the ribs are tapered inwardly and downwardly; and the outside diameter thereof at the lower end thereof, defined by the outside faces of the ribs, is about the same as or marginally smaller than the inside diameter of a steering wheel shaft having a tubular form to be fitted over the lower-portion; two diametrically-opposed support members extending outwardly from the periphery of the lower-portion to about the same distance as the outside faces of the ribs; and a hole extending transversely through the lower-portion in the regions of the two support members.

Further aspects of the invention will become apparent from the following description of the invention and preferred embodiments thereof.

BRIEF DESCRIPTION OF THE DRAWINGS

In the drawings, which illustrate the invention and embodiments thereof.

DETAILED DESCRIPTION OF THE INVENTION AND PREFERRED EMBODIMENTS

Figure 1:
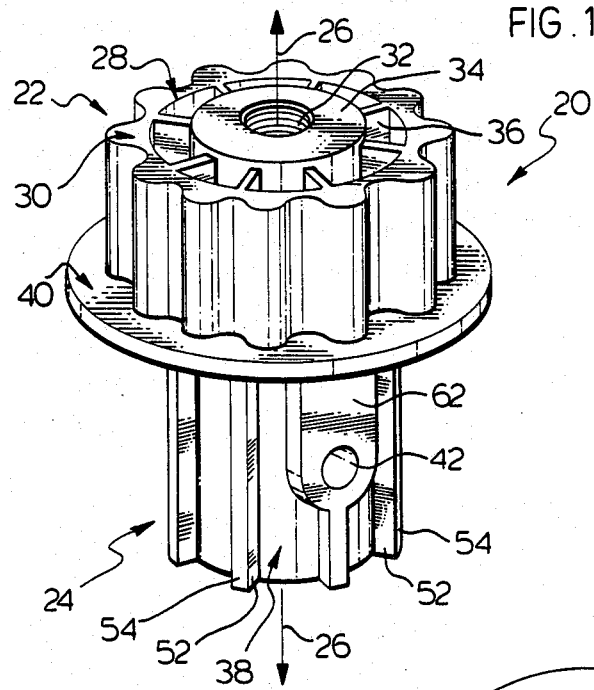
FIG. 1 is a perspective view of an embodiment of the invention.

With reference to FIG. 1, an adaptor of this invention can be seen. The adaptor is numbered 20. The adaptor comprises an upper-portion 22 and a lower-portion 24. The upper-portion 22 and lower-portion 24 share a common axis 26 so that lower-portion 24 depends concentrically from upper-portion 22. Preferably, a flange 40 connects the upper-portion 20 and the lower portion 24.

Figures 8, 9:
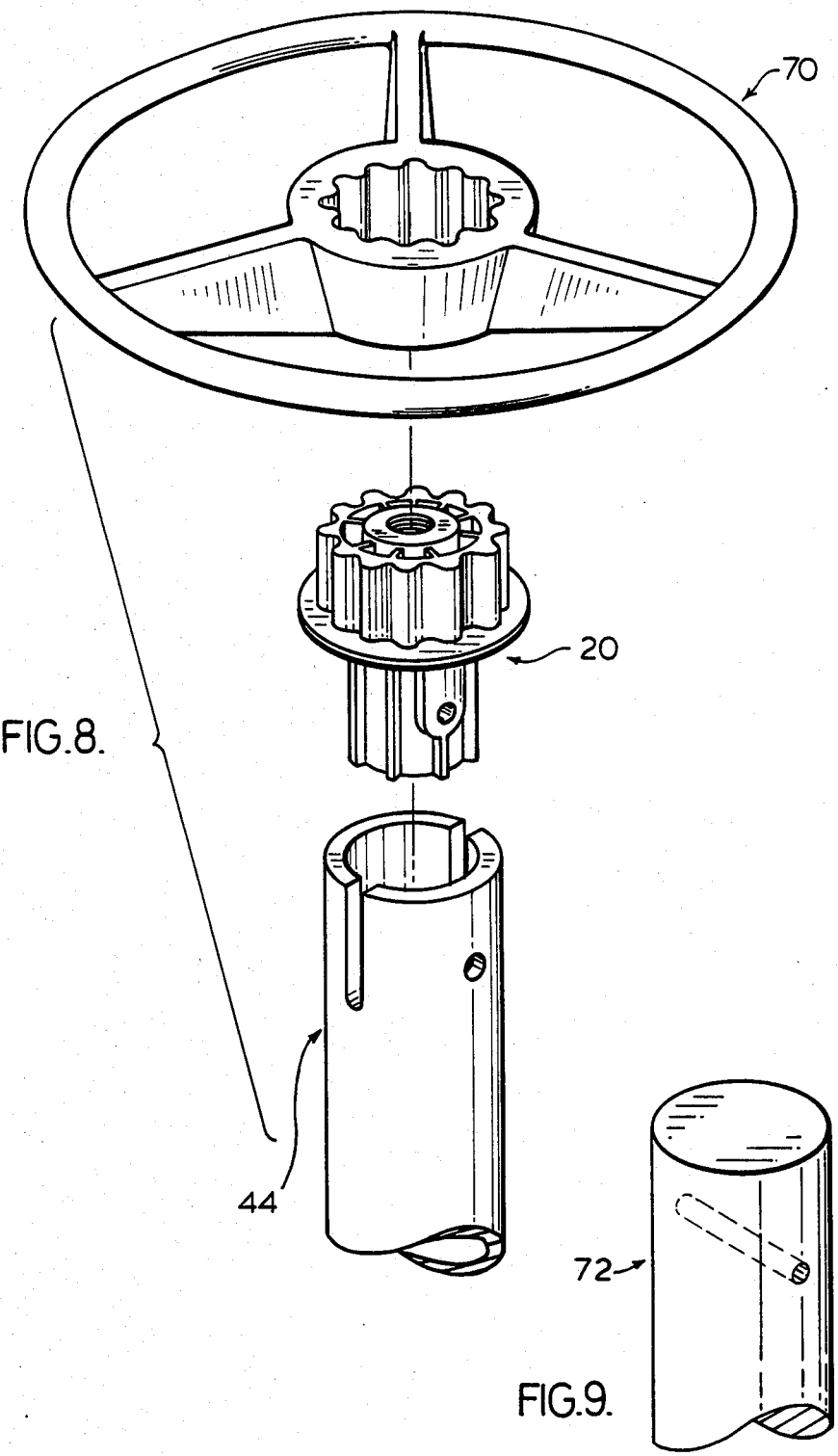
FIG. 8 is a perspective view showing the adaptor of this invention about to be meshed with a steering wheel and fitted with a steering wheel shaft.
FIG. 9 is a perspective view of the end of a rod-like steering wheel shaft.

The upper-portion 22 is intended to mesh with the steering wheel 70 (FIG. 8) so that on the periphery 28 of the upper-portion 22 is a plurality of meshing means 30 for meshing with the steering wheel. The meshing means 30 can be any sort of suitable means such as a series of splines (not shown). The meshing means 30 extend axially with axis 26 as shown in FIG. 1 and are spaced apart along the periphery 28 as best shown in FIG. 2.

Figure 2:
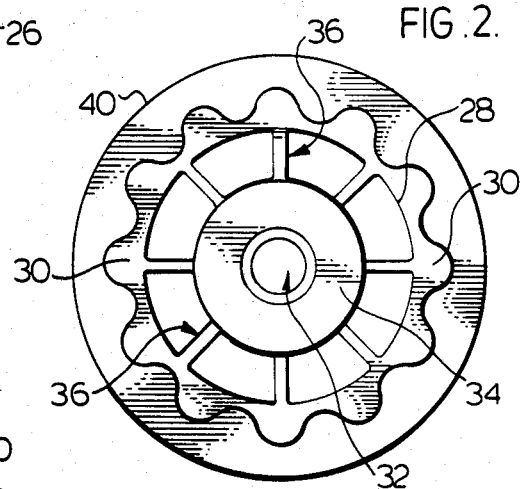
FIG. 2 is a top plan view of the embodiment.

Preferably, meshing means 30 are undulations which can be best be seen in FIG. 2. Undulations have a generally smoothly curving surface.

Preferably, the meshing means 30 are symmetrically spaced.

Preferably, the periphery 28 of the upper-portion 22 is 1½" in diameter and the diameter of the upper-portion 22, including the meshing means 30, is about 1 13/16".

Figure 3:
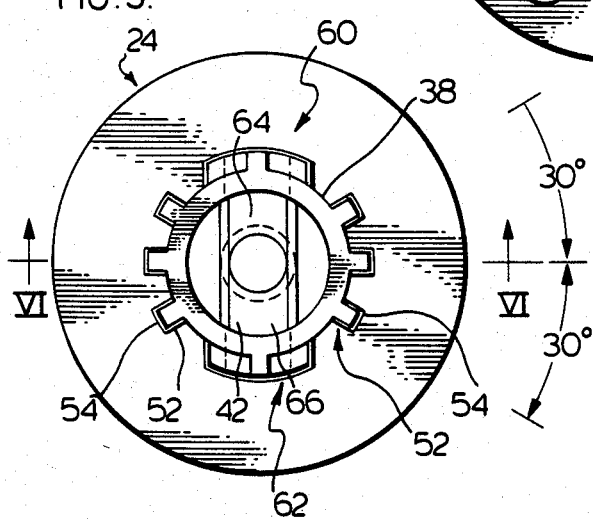
FIG. 3 is a bottom plan view of the embodiment.
Figure 6:
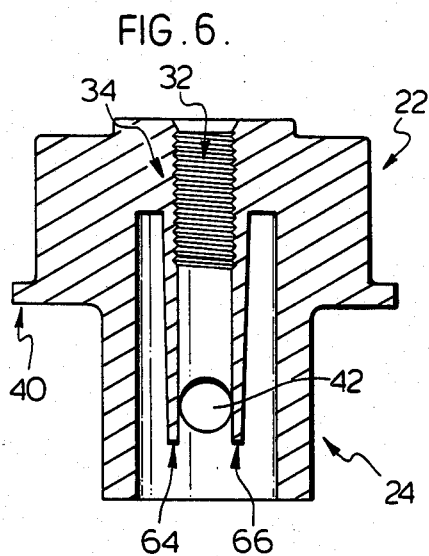
FIG. 6 is a cross-sectional view taken along line VI—VI in FIG. 3.

In the upper-portion 22 is a threaded hole 32 extending downwardly and concentrically within the upper-portion 22 as best shown in FIG. 6 which is a cross-sectional view along the line VI—VI in FIG. 3.

The threaded hole 32 is used to receive a bolt which fixes the steering wheel to the adaptor 20. Accordingly, the threaded hole 32 should have a diameter sufficiently large to withstand the strain from the steering wheel. Preferably, a diameter of about 5/16 is used. The threaded hole 32 must also extend far enough into the upper-portion 22 in order to withstand the strain from the steering wheel. Preferably, a depth of about 1½" is used.

Surrounding the threaded hole 32 in upper-portion 22 is a solid portion 34. The solid portion 34 is required in order to give sufficient support to the threaded hole 32. Preferably, it is possible to have the solid portion 34 extend to the periphery 28 of the upper-portion 22. However, material can be saved and sufficient strength can be obtained if the solid portion 34 is used only in the immediate region of the hole 32 and a plurality of structural ribs 36 extend radially from the solid portion 34 to the periphery 28 of the upper-portion 22 as shown in FIG. 2. Preferably, the solid portion 34 has a diameter of just under 1".

Preferred embodiments of the lower-portion 24 of the adaptor 20 can be seen in several of the figures, especially FIG. 3. Preferably, the lower-portion 24 is hollow with a periphery 38. However, it is possible for the lower portion 24 to be solid.

Extending transversely through the lower-portion 24 is a hole 42 (FIG. 1). The hole 42 should have a diameter such that the bolt passing through the hole 42 will have sufficient strength to secure the steering wheel shaft 44 to the lower-portion 24 of the adaptor 20 but not so large that the lower-portion 24 does not have sufficient strength. The position of the hole 42 in the lower-portion 24 is not critical.

Figure 4:
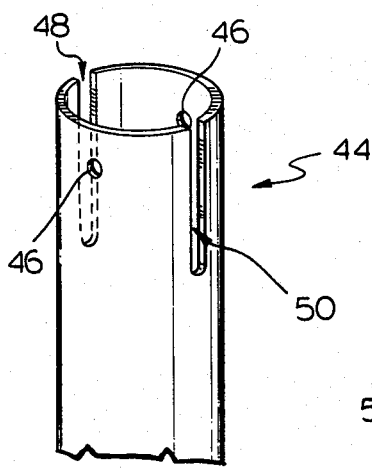
FIG. 4 is a perspective view of a tubular steering wheel column used with an embodiment of the invention.

When the adaptor 20 is used, the hole 42 receives a bolt (not shown) for fixing a tubular steering wheel shaft 44 (FIG. 4) to the adaptor 20. The tubular steering wheel shaft 44 fits over the lower portion 24 and has a hole 46 corresponding to the hole 42 in the lower-portion 24. The bolt is passed through the holes 46 and 42 and then tightened to secure the steering wheel shaft 44 to the lower portion 24 of the adaptor 20. As the bolt is tightened, because the end of the steering wheel shaft tube 44 has slits 48, 50, the end of the tubular steering wheel shaft 44 is collapsed to the size of the outside diameter of the lower portion 24.

It has been found that when the tubular steering wheel shaft 44 was placed over a lower-portion 24 that had a smooth-surfaced outside diameter, a tight fit could not be obtained between the adaptor 20 and the steering wheel shaft 44. It is believed that the variation in tolerances of the outside diameter of the periphery 38 of the lower-portion 24 and the inside diameter of the tubular steering wheel shaft 44 resulted in the fit between the lower-portion 24 and the steering wheel shaft 44 being lose.

Because the steering wheel has a relatively large radius, a large torque can be created when an operator pulls on the steering wheel thus causing a large torque to be developed at the adaptor steering wheel shaft connection. Inevitably, this causes a rocking motion between the steering wheel and steering wheel shaft. So long as there is some variation in the tolerances, there will never be a sufficiently tight fit between the adaptor 20 and the steering wheel shaft 44 and so there will always be a rocking motion between the tubular steering wheel shaft 44 and the steering wheel.

In order to overcome this problem, a plurality of tapered ribs 52 has been provided on the periphery 38 of the lower-portion 24. The ribs 52 are spaced around the periphery 38 and extend axially along the periphery 38. Also, the outside faces 54 of the ribs 52 are tapered inwardly and downwardly. Preferably, each rib 52 has a taper of about ½° so as to provide an effective taper for the outside diameter of the lower-portion 24 of about 1°.

With tapered ribs 52 spaced about the periphery 38 of the lower-portion 24, the tubular steering wheel shaft 44 will tend to stretch, distort or straighten out as the tubular steering wheel shaft 44 is moved further up the lower-portion 24. This stretching, distortion or straightening out tends to take up the variation in the tolerances of the tubular steering wheel shaft 44 and the lower-portion 24.

Figure 5:
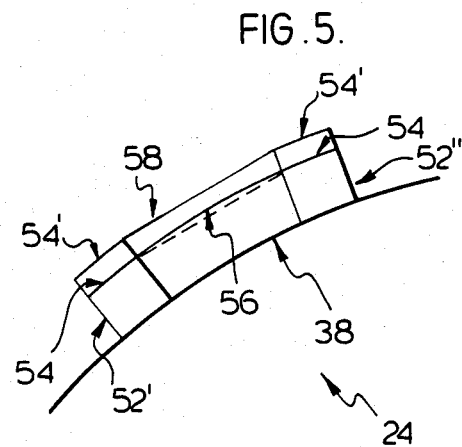
FIG. 5 is a schematic drawing of a feature of the invention.

When the tubular steering wheel shaft 44 comes in contact with the outside faces 54 of adjacent ribs 52 (shown as 52' and 52" in FIG. 5), the tubular steering wheel shaft 44 has an arcuate shape 56 between the corners of those ribs 52', 52" as shown in an exaggerated fashion in FIG. 5. However, as the tubular steering wheel shaft 44 is moved further up the lower portion 24, the outside faces 54 (shown as 54' in FIG. 5) at that new location of the ribs 52', 52" are further away from the periphery 38 than were the outside faces 54 at a position lower down on the lower portion 24. This is a result of the taper in the ribs 52. Thus, when the tubular steering wheel shaft 54 is at a position higher up on the lower portion 24, the distance between the corners of the ribs 52' and 52" is greater than the distance between corners at a position lower down on the lower portion 24. This means that the equivalent distance to arc 56 at a lower position on lower portion 24 is a straight line 58 at a higher position. Thus, the tubular steering wheel shaft 54 must distort, stretch or straighten out to a straight line 58 in order to fit over the tapered ribs 52', 52".

It has been found that little additional force is required in order to fit the tubular steering wheel column 44 over the tapered ribs 52 but that substantial improvements in the tightness or snuggness of the fit between the lower portion 24 and the tubular steering wheel shaft 44 are obtained.

It will be understood that the effective outside diameter of the lower portion 24 at the lower end thereof, as defined by the outside faces 54 of the ribs 52, should be about the same as, or marginally smaller than, the inside diameter of the tubular steering wheel shaft 44.

The number and configuration of ribs 52, as well as the width of individual ribs 52, is variable and depends on how much stretch or distortion of the tubular steering wheel shaft 44 is desired and how much strength is required for the particular application.

Preferably, the ribs 52 should be spaced symmetrically about the periphery 38 of the lower portion 24.

Preferably, there are two sets of three ribs 52 in each set and each rib 52 within each set is spaced about 30° from each adjacent rib 52 in the particular set.

Preferably, the ribs are about 1/16 inch to about ⅛ inch wide.

Support members should extend from the periphery 38 of the lower portion 24 in order to give support to the tubular steering wheel shaft 44 in the regions of the openings of the transvere hole 42. This is because, as the bolt passing through hole 42 is tightened, the tubular steering wheel shaft 44 will collapse until it encounters a force sufficiently strong to resist the tightening of the bolt. Diametrically opposed support members in the regions of the holes 42 provide an effective outside diameter to the lower portion 24 so as to prevent the further collapse of the tubular steering wheel shaft 44. Preferably, the effective outside diameter provided by the support members should be about the same as the effective outside diameter of the outer faces 54 of the ribs 52.

A suitable support member is shown as 62 in FIG. 1. The pair of support members 60, 62 can be seen in FIG. 3.

In a preferred embodiment of the invention, there are two parallel support ribs 64, 66 extending downwardly within the lower portion 24 as best seen in FIG. 6. Preferably, the ribs 64, 66 are parallel to a plane passing through an axis of the transverse hole 42 and also parallel to a plane passing through an axis of the threaded hole 32. Preferably, the ribs 64, 66 extend upwardly into the upper portion 22 so as to connect to the solid portion 34.

Preferably the diameter of the transverse hole 42 is marginally greater than the space in between the parallel support ribs 64, 66. This provides additional strength to the bolt within the transverse hole 42.

Preferably, the outside diameter of the upper portion 22, including the meshing means 30, is greater than the outside diameter of the lower portion 24, including the ribs 52.

Preferably, the flange 40 has an outside diameter that is greater than the outside diameter of the upper portion 22.

Figure 7:
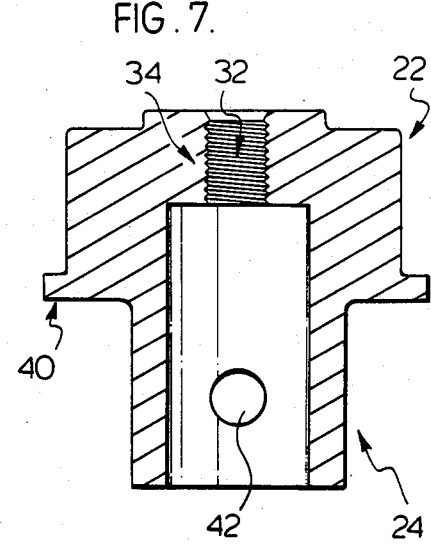
FIG. 7 is a cross-sectional view of a further embodiment of the invention.

Because the majority of steering wheel shafts were rod-like in the past, (as shown as 72 in FIG. 9) and there is now a shift to the use of tubular steering wheel shafts, it is preferable that a single adaptor can accommodate either type of steering wheel shaft. To this end, the adaptor of this invention can be molded so as to provide such an adaptor. Accordingly, the adaptor can be molded so that the lower portion 24 is hollow and does not have any support ribs 64, 66. This is accomplished simply by modifying the molds so as to remove support ribs 64, 66 so as to result in an adaptor as illustrated in FIG. 7.

In such an embodiment, the lower portion 24 is hollow and the inside diameter of the lower portion 24 is marginally larger than the outside diameter of the rod-like steering wheel shaft that is to fit into the lower portion 24 so that the steering wheel shaft can fit into the lower portion 24.

Even if the adaptor 20 is molded with the support ribs 64, 66, the ribs 64, 66 can be removed by a process such as drilling and reaming in order to provide a fit for a rod-like steering wheel shaft.

Preferably, the adaptor is made by molding a suitable material in an appropriate mold. Preferably the adaptor is made as a single piece in order to faciliate production.

Suitable materials for the adaptor include any material of sufficient tensile strength. Materials with tensile strengths of about 35,000 to 40,000 psi have been found acceptable. Preferably, a zinc-based die casting alloy sold by International Nichel Company under the trade mark ZAMAC 3 is used.

Although the disclosure describes and illustrates preferred embodiments of the invention, it is to be understood that the invention is not restricted to these particular embodiments.

What I claim is:

1. A molded, one-piece adaptor for concentrically connecting a steering-wheel and a steering-wheel shaft, comprising:
   a substantially-cylindrical upper-portion having a periphery and an axis for meshing with said steering wheel, and a substantially-cylindrical lower-portion having a periphery and depending concentrically from said upper-portion for connecting to said steering-wheel shaft;
   wherein said upper-portion has:
   a plurality of meshing means extending axially along and spaced around said periphery thereof; and
   a threaded hole extending downwardly and concentrically within said upper-portion; and
   wherein, said lower-portion has:
   a plurality of tapered ribs extending axially along and spaced around the periphery thereof, wherein each of said ribs has an outside face that is tapered inwardly and downwardly; and said lower-portion has an outside diameter at a lower end thereof, defined by said outside faces of said ribs, which is the same as or smaller than the inside diameter of a steering wheel shaft having a tubular form to be fitted over said lower-portion;
   two diametrically-opposed support members extending outwardly from said periphery of said lower-portion to about the same distance as said outside faces of said ribs; and
   a hole extending transversely through said lower-portion and said two support members.

2. An adaptor as defined in claim 1 wherein said meshing means are undulations.

3. An adaptor as defined in claim 2 wherein said ribs are symmetrically spaced.

4. An adaptor as defined in claim 3 wherein there are two sets of at least three ribs and each rib within each set is spaced about 30° from each adjacent rib in that set of ribs.

5. An adaptor as defined in claim 4 wherein said taper on each rib is about $\frac{1}{2}°$.

6. An adaptor as defined in claim 1, wherein said lower portion is substantially hollow and two parallel, spaced-apart support ribs are positioned within said adaptor that are parallel to a plane passing through an axis of said transverse hole and parallel to a plane passing through an axis of said threaded hole.

7. An adaptor as claimed in claim 5, wherein said lower portion is substantially hollow and two parallel, spaced-apart support ribs are positioned within said adaptor that are parallel to a plane passing through an axis of said transverse hole and parallel to a plane passing through an axis of said threaded hole.

8. An adaptor as claimed in claim 6, wherein the diameter of said transverse hole is greater than said spacing between said parallel support ribs.

9. An adaptor as claimed in claim 7, wherein said diameter of said transverse hole is marginally greater than said spacing between said parallel support ribs.

10. An adaptor as claimed in claim 1, wherein said upper-portion has a solid portion surrounding said threaded hole and a plurality of structural ribs extending radially from said solid portion to said periphery of said upper-portion.

11. An adaptor as claimed in claim 9, wherein said upper-portion has a solid portion surrounding said threaded hole and a plurality of structural ribs extending radially from said solid portion to said periphery of said upper-portion.

12. An adaptor as claimed in claim 1, wherein each of said upper-portion and said lower-portion has an outside diameter and said outside diameter of said upper-portion is greater than said outside diameter of said lower-portion.

13. An adaptor as claimed in claim 11, wherein each of said upper-portion and said lower-portion has an outside diameter and said outside diameter of said upper-portion is greater than said outside diameter of said lower-portion.

14. An adaptor as claimed in claim 1, wherein said upper-portion has an outside diameter and wherein a flange having a diameter greater than said outside diameter of said upper-portion connects said upper-portion to said lower-portion.

15. An adaptor as claimed in claim 13, wherein said upper-portion has an outside diameter and wherein a flange having a diameter greater than said outside diameter of said upper-portion connects said upper-portion to said lower-portion.

16. An adaptor as claimed in claim 1, wherein said lower portion is hollow and has an inside diameter larger than the outside diameter of a steering wheel shaft having a rod-like form to be fitted within said lower-portion.

17. An adaptor as claimed in claim 15, wherein said lower portion is hollow and has an inside diameter larger than the outside diameter of a steering wheel shaft having a rod-like form to be fitted within said lower-portion.

* * * * *